United States Patent
Ochiai et al.

(10) Patent No.: US 7,692,940 B2
(45) Date of Patent: Apr. 6, 2010

(54) VOLTAGE CONVERSION DEVICE

(75) Inventors: Kiyoe Ochiai, Nagoya (JP); Masaki Okamura, Toyota (JP); Sojiro Yokoyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 241 days.

(21) Appl. No.: 11/991,402

(22) PCT Filed: Dec. 14, 2006

(86) PCT No.: PCT/IB2006/003614

§ 371 (c)(1),
(2), (4) Date: Mar. 4, 2008

(87) PCT Pub. No.: WO2007/069055

PCT Pub. Date: Jun. 21, 2007

(65) Prior Publication Data

US 2009/0128117 A1    May 21, 2009

(30) Foreign Application Priority Data

Dec. 16, 2005    (JP)    ............................ 2005-363687

(51) Int. Cl.
*H02M 5/458*    (2006.01)
*H02M 7/00*    (2006.01)

(52) U.S. Cl. .............................. 363/98; 363/37; 363/71; 363/132

(58) Field of Classification Search .................... 363/98, 363/37, 71, 131, 132
See application file for complete search history.

(56) References Cited

U.S. PATENT DOCUMENTS

| 5,550,445 | A | * | 8/1996 | Nii | ............................. | 318/153 |
| 6,333,612 | B1 | | 12/2001 | Suzuki et al. | | |
| 7,102,903 | B2 | * | 9/2006 | Nakamura et al. | ............. | 363/98 |
| 7,120,037 | B2 | * | 10/2006 | Komatsu et al. | .............. | 363/37 |
| 2005/0254265 | A1 | * | 11/2005 | Yamada | ........................ | 363/13 |
| 2007/0058404 | A1 | * | 3/2007 | Yaguchi | ..................... | 363/132 |

FOREIGN PATENT DOCUMENTS

| JP | A-07-264868 | 10/1995 |
| JP | A-2004-229399 | 8/2004 |
| WO | WO 2005/013467 A1 | 2/2005 |
| WO | WO 2005/013471 A1 | 2/2005 |

* cited by examiner

*Primary Examiner*—Bao Q Vu
(74) *Attorney, Agent, or Firm*—Oliff & Berridge PLC

(57) ABSTRACT

A voltage transformer, which is placed between a DC power source (B) and a motor (M1), includes: a voltage sensor (10) and an electric current sensor (11), which senses input and output of electric power to and from the DC power source (B); a buck-boost converter (12) having power control elements, which is placed in a path connecting between power lines (PL1) and (PL2) that establish the connection to the DC power source (B) and the connection to the motor (M1), respectively; and a controller (30) for controlling the buck-boost converter (12). The controller (30) monitors the change in the regenerated power that is supplied to the DC power source (B), based on the outputs from the voltage sensor (10) and the electric current sensor (11), and, if the amount of change in the regenerated power is greater than a predetermined amount, the controller (30) changes the operation mode of the buck-boost converter (12) from a rapid operation mode to a slow operation mode.

7 Claims, 7 Drawing Sheets

| BATTERY TEMPERATURE | −15°C OR BELOW | −15〜−5°C | −5°C OR ABOVE |
|---|---|---|---|
| Kp DURING NORMAL CONTROL | 2 | 1.5 | 1 |
| Kp DURING CORRECTION | 1.5 | 1.2 | 1 |

VOLTAGE CONVERSION DEVICE

BACKGROUND OF THE INVENTION

1. Field of the Invention

The present invention relates to a voltage transformer for transforming a DC voltage supplied from a DC power source to a desired voltage.

2. Description of the Related Art

In recent years, hybrid vehicles and electric vehicles gain much attention as "green" vehicles.

The hybrid vehicle has a DC power source, an inverter, and a motor that is driven by the inverter, as a driving power source in addition to a conventional engine. Specifically, the hybrid vehicle obtains driving power through the operation of the engine, and by rotating the motor by using the AC voltage that is obtained by converting a DC voltage supplied from the DC power source to the AC voltage via the inverter. The electric vehicle has a DC power source, an inverter, and a motor that is driven by the inverter, as a driving power source.

With regard to the hybrid vehicles and the electric vehicles, it has been studied to boost the DC voltage supplied from the DC power source by using a buck-boost converter, and supply the boosted DC voltage to an inverter for driving a motor. Japanese Patent Application Publication No. 2004-229399 ("JP 2004-229399") discloses a voltage transformer that supplies electric power to an electric load in such a way that an overcurrent is prevented from flowing through circuit elements even when the voltage specifying value of such a buck-boost converter suddenly increases. A related art is disclosed in Japanese Patent Application Publication No. 7-264868.

However, JP 2004-229399 does not mention a situation in which the regeneration becomes excessive due to the sudden decrease in the rotation speed of driving wheels at the time of landing after a wheel hits an obstacle on a rough road and temporarily turns free, for example. In such a case, the control stability can be worsened due to the oscillation of the inverter voltage, the battery voltage and the battery current.

SUMMARY OF THE INVENTION

An objective of the present invention is to provide a voltage transformer of which the control stability is improved.

A voltage transformer according to a first aspect of the present invention is a voltage transformer placed between a DC power source and an electric motor, the voltage transformer including: a sensor for sensing input and output of electric power to and from the DC power source; a driver including power control elements, which is placed in a path connecting between a first power line that establishes connection to the DC power source and a second power line that establishes connection to the motor; and a controller for controlling the driver. The controller monitors the change in regenerated power that is supplied to the DC power source, based on an output from the sensor, and, when the amount of change in the regenerated power is greater than a predetermined amount, the controller changes an operation mode of the driver from a rapid operation mode to a slow operation mode.

In the voltage transformer according to the first aspect described above, the controller may perform feedback control of the driver, based on a result of comparing a voltage of the second power line and a desired voltage, and change the operation mode from the rapid operation mode to the slow operation mode by decreasing a value of a feedback gain.

In the above voltage transformer, it is also preferable that, when the amount of change in the regenerated power is greater than the predetermined amount, the controller decrease the desired voltage.

In the above voltage transformer, it is also preferable that the controller change the feedback gain according to the temperature of the DC power source.

In the above voltage transformer, it is also preferable that the feedback control be PI control, and that the controller change at least one of a proportional gain and an integral gain, which are feedback gains of the PI control.

According to the above aspect of the present invention, the oscillation of electric current and voltage is suppressed, and it is possible to improve the control stability of the voltage transformer.

A vehicle according to the present invention includes one of the above-described voltage transformers.

A voltage transformation method according to the present invention includes: sensing input and output of electric power to and from a DC power source; monitoring the change in regenerated power that is supplied to the DC power source, based on the input and output of the electric power; and changing an operation mode of a driver including power control elements from a rapid operation mode to a slow operation mode when the amount of change in the regenerated power is greater than a predetermined amount.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein.

DETAILED DESCRIPTION OF THE PREFERRED EMBODIMENTS

Figure 1:
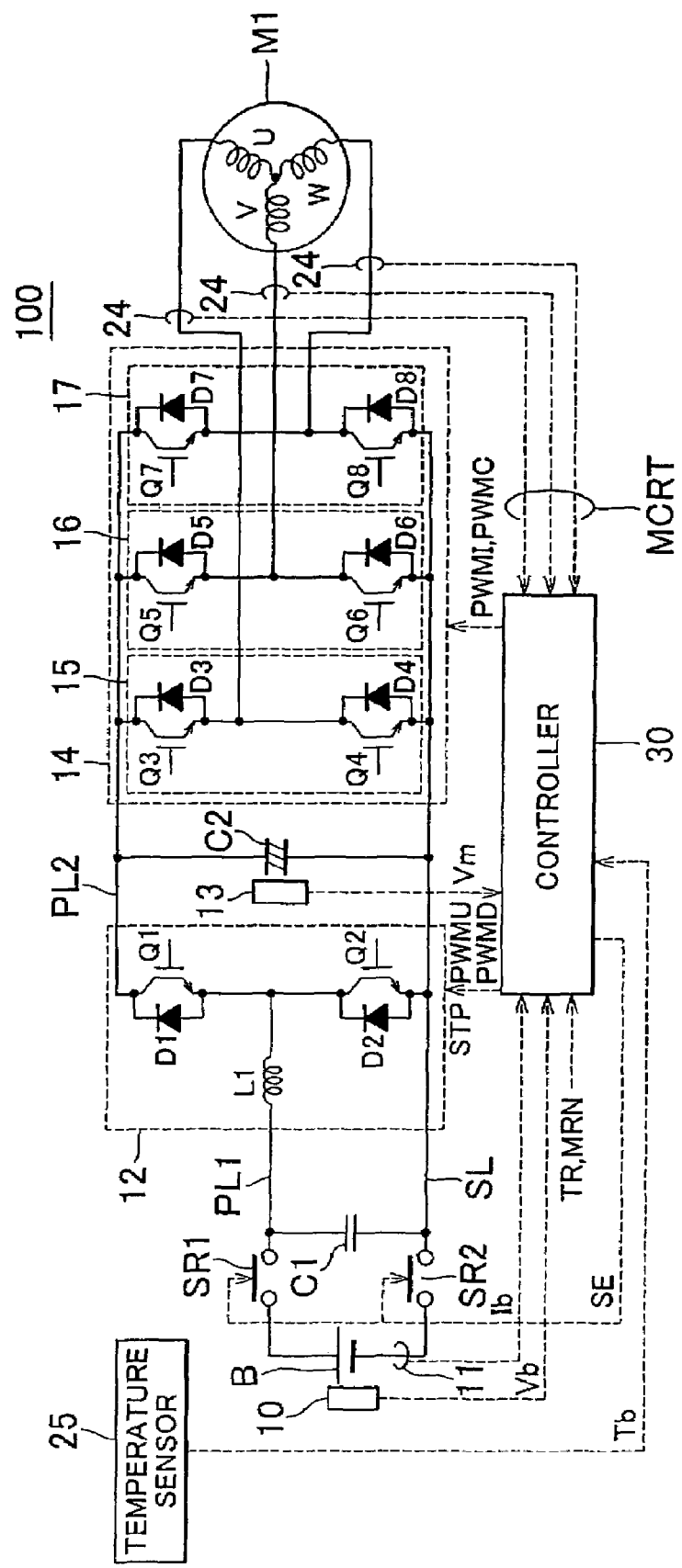
FIG. 1 is a circuit diagram of a motor drive system including a voltage transformer according to an embodiment of the present invention.

Embodiments of the present invention will be described in detail below with reference to the drawings. It should be noted that the same or corresponding parts are designated by like reference numerals or symbols, and the description thereof is not repeated.

FIG. 1 is a circuit diagram of a motor drive system including a voltage transformer according to this embodiment of the present invention.

Referring to FIG. 1, the motor drive system 100 includes a DC power source B, voltage sensors 10 and 13, system relays SR1 and SR2, capacitors C1 and C2, a buck-boost converter 12, an inverter 14, electric current sensors 11 and 24; a temperature sensor 25, and a controller 30. An AC motor M1 is a drive motor for producing torque used to drive driving wheels of a hybrid vehicle or an electric vehicle. The AC motor M1 may be installed in a hybrid vehicle as a device that serves as an electric generator that is driven by an engine, and also serves as the electric motor for the engine that can start the engine, for example.

The buck-boost converter 12 includes a reactor L1, NPN transistors Q1 and Q2, and diodes D1 and D2. One end of the reactor L1 is connected to a power line PL1 of the DC power source B, and the other end thereof is connected to an intermediate point between the NPN transistors Q1 and Q2, that is, between the emitter of the NPN transistor Q1 and the collector of the NPN transistor Q2. The NPN transistors Q1 and Q2 are connected in series between a power line PL2 and a ground line SL. The collector of the NPN transistor Q1 is connected to the power line PL2, and the emitter of the NPN transistor Q2 is connected to the ground line SL. The diodes D1 and D2, which allow electric current to flow from the emitter side to the collector side of the NPN transistors Q1 and Q2, are placed between the collectors and the emitters of the NPN transistors Q1 and Q2, respectively.

The inverter 14 includes a U-phase arm 15, a V-phase arm 16, and a W-phase arm 17. The U-phase arm 15, the V-phase arm 16, and the W-phase arm 17 are placed in parallel between the power line PL2 and the ground line SL.

The U-phase arm 15 includes NPN transistors Q3 and Q4, which are connected in series. The V-phase arm 16 includes NPN transistors Q5 and Q6, which are connected in series. The W-phase arm 17 includes NPN transistors Q7 and Q8, which are connected in series. Diodes D3 to D8, which allow electric current to flow from the emitter side to the collector side of the NPN transistors Q3 to Q8, are placed between the collectors and the emitters of the NPN transistors Q3 to Q8, respectively.

The intermediate points in the arms of the respective phases are connected to the ends of the corresponding phases of the coils of the AC motor M1. The AC motor M1 is a three-phase, permanent magnet motor, in which one ends of the three coils, U-phase coil, the V-phase coil and the W-phase coil, are connected at a central point, the other end of the U-phase coil is connected to the intermediate point between the NPN transistors Q3 and Q4, the other end of the V-phase coil is connected to the intermediate point between the NPN transistors Q5 and Q6, and the other end of the W-phase coil is connected to the intermediate point between the NPN transistor Q7 and Q8.

Instead of the NPN transistors Q1 to Q8 and the like, the other power switching elements, such as IGBTs and power MOSFETs, can be used.

The DC power source B includes a secondary battery, such as a nickel-metal hydride battery and a lithium-ion battery. The voltage sensor 10 senses the DC voltage Vb that is output from the DC power source B, and outputs the sensed DC voltage Vb to the controller 30. The electric current sensor 11 senses the direct current Ib that is output from the DC power source B, and outputs the sensed value of the direct current Ib to the controller 30. The temperature sensor 25 senses the temperature Tb of the DC power source B, and outputs the sensed temperature to the controller 30. The system relays SR1 and SR2 are turned on and off by a signal SE from the controller 30.

The capacitor C1 smoothes the DC voltage supplied from the DC power source B, and supplies the smoothed DC voltage to the buck-boost converter 12.

The buck-boost converter 12 boosts the DC voltage supplied from the capacitor C1, and supplies the boosted voltage to the capacitor C2. More specifically, upon receiving a signal PWMU from the controller 30, the buck-boost converter 12 boosts the DC voltage according to the period during which the NPN transistor Q2 is turned on by the signal PWMU, and supplies the boosted voltage to the capacitor C2. In this case, the NPN transistor Q1 is in an off state due to the signal PWMU. Upon receiving a signal PWMD from the controller 30, the buck-boost converter 12 bucks the DC voltage supplied from the inverter 14 via the capacitor C2 to charge the DC power source B.

The capacitor C2 smoothes the DC voltage supplied from the buck-boost converter 12, and supplies the smoothed DC voltage to the inverter 14. The voltage sensor 13 senses the voltage across the capacitor C2, that is, the output voltage Vm of the buck-boost converter 12 (which corresponds to the voltage input to the inverter 14; the same applies hereinafter), and outputs the sensed output voltage Vm to the controller 30.

When a DC voltage is supplied from the capacitor C2, the inverter 14 converts the DC voltage to an AC voltage based on a signal PWMI from the controller 30 to drive the AC motor M1. Thus, the AC motor M1 is driven so as to produce the torque that is specified by a torque specifying value TR. During regenerative braking of the hybrid vehicle or the electric vehicle in which the motor drive system 100 has been installed, the inverter 14 converts the AC voltage generated by the AC motor M1 to a DC voltage based on a signal PWMC from the controller 30, and supplies the resultant DC voltage to the buck-boost converter 12 via the capacitor C2.

The regenerative braking herein includes the braking accompanied by electricity regeneration that is performed when a driver driving the hybrid vehicle or the electric vehicle operates the foot brake, and the deceleration of the vehicle (or stopping the acceleration thereof) by releasing the accelerator pedal while the vehicle is running, with electricity regeneration performed.

The electric current sensor 24 senses an electric current MCRT flowing through the AC motor M1, and outputs the sensed value of the motor current MCRT to the controller 30.

The controller 30 generates the signal PWMU for driving the buck-boost converter 12 and the signal PWMI for driving the inverter 14, based on the torque specifying value TR and the number of revolutions of the motor MRN, which are supplied from an electrical control unit (ECU) provided externally, the DC voltage Vb, which is supplied from the voltage sensor 10, the output voltage Vm, which is supplied from the voltage sensor 13, and the motor current MCRT, which is supplied from the electric current sensor 24. The controller then outputs the generated signals PWMU and PWMI to the buck-boost converter 12 and the inverter 14, respectively.

The signal PWMU is the signal for driving the buck-boost converter 12 when the buck-boost converter 12 converts the DC voltage supplied from the capacitor C1 to the output voltage Vm. When the buck-boost converter 12 converts the DC voltage to the output voltage Vm, the controller 30 generates the signal PWMU for driving the buck-boost converter 12 so as to make the output voltage Vm equal to a voltage specifying value Vdc_com that is an optimal value (desired value) of the voltage input to the inverter by performing feedback control of the output voltage Vm.

Upon receiving, from the external ECU, the signal indicating that the hybrid vehicle or the electric vehicle has gone into regenerative braking mode, the controller 30 generates the signal PWMC for converting the AC voltage generated by the AC motor M1 to a DC voltage, and outputs the signal to the inverter 14. In this case, switching of the NPN transistors Q3 to Q8 of the inverter 14 is controlled by the signal PWMC. Thus, the inverter 14 converts the AC voltage generated by the AC motor M1 to a DC voltage, and supplies the resultant voltage to the buck-boost converter 12.

In addition, upon receiving, from the external ECU, the signal indicating that the hybrid vehicle or the electric vehicle has gone into regenerative braking mode, the controller 30 generates the signal PWMD for bucking the DC voltage supplied from the inverter 14, and outputs the generated signal PWMD to the buck-boost converter 12. Thus, the AC voltage generated by the AC motor M1 is converted to a DC voltage, and the DC voltage is then bucked and supplied to the DC power source B.

Moreover, the controller 30 generates the signal SE for turning on and off the system relays SR1 and SR2, and outputs the signal SE to the system relays SR1 and SR2.

Figure 2:
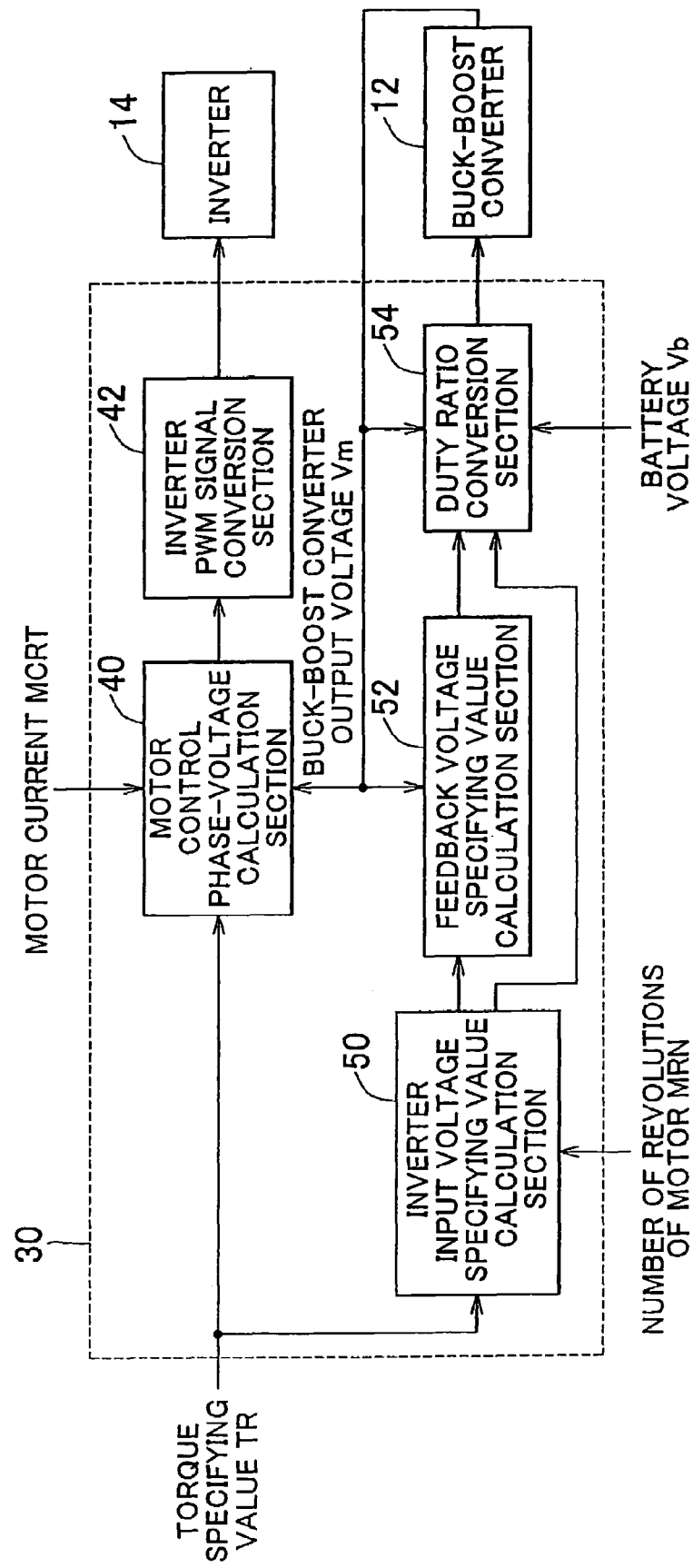
FIG. 2 is a functional block diagram of a controller shown in FIG. 1.

FIG. 2 is a functional block diagram of the controller 30. Referring to FIG. 2, the controller 30 includes: a section 40 for calculating the voltage of the respective phases for controlling the motor; a section 42 for performing conversion to generate a PWM signal for the inverter; a section 50 for calculating the voltage specifying value that specifies the voltage to be input to the inverter; a section 52 for calculating a feedback voltage specifying value; and a section 54 for performing conversion to obtain a signal corresponding to a duty ratio.

The motor control phase-voltage calculation section 40 receives the output voltage Vm of the buck-boost converter 12, that is, the voltage to be input to the inverter 14, from the voltage sensor 13, receives the values of the motor current MCRT flowing through the coils of the respective phases of the AC motor M1 from the electric current sensor 24, and receives the torque specifying value TR from the external ECU. The motor control phase-voltage calculation section 40 calculates the voltage to be applied to the coils of the respective phases of the AC motor M1 based on these input signals, and supplies the calculation results to the inverter PWM signal conversion section 42. The inverter PWM signal conversion section 42 generates the signals PWMI and PWMC for actually turning on and off the NPN transistors Q3 to Q8 of the inverter 14 based on the calculation results supplied from the motor control phase-voltage calculation section 40, and outputs the generated signals PWMI and PWMC to the NPN transistors Q3 to Q8 of the inverter 14.

In this way, switching of the NPN transistors Q3 to Q8 is controlled, and the NPN transistors Q3 to Q8 control the electric current that flows through the coils of the respective phases of the AC motor M1 so that the AC motor M1 produces the specified torque. In this way, the motor drive current is controlled and the motor torque corresponding to the torque specifying value TR is produced.

The inverter input voltage specifying value calculation section 50 calculates the optimal value (desired value) of the voltage input to the inverter, that is, the voltage specifying value Vdc_corn, based on the torque specifying value TR and the number of revolutions of the motor MRN, and outputs the voltage specifying value Vdc_corn thus calculated to the feedback voltage specifying value calculation section 52.

The feedback voltage specifying value calculation section 52 calculates a feedback voltage specifying value Vdc_com_fb, based on the output voltage Vm of the buck-boost converter 12, which is supplied from the voltage sensor 13, and on the voltage specifying value Vdc_corn, which is supplied from the inverter input voltage specifying value calculation section 50, by using the method described later. The feedback voltage specifying value calculation section 52 then outputs the calculated feedback voltage specifying value Vdc_com_fb to the duty ratio conversion section 54.

The duty ratio conversion section 54 calculates a duty ratio that is used to make the output voltage Vm, which is supplied from the voltage sensor 13, equal to the feedback voltage specifying value Vdc_com_fb, based on the DC voltage Vb supplied from the voltage sensor 10 and the feedback voltage specifying value Vdc_com_fb supplied from the feedback voltage specifying value calculation section 52. The duty ratio conversion section 54 then generates the signals PWMU and PWMD for turning on and off the NPN transistors Q1 and Q2 of the buck-boost converter 12, based on the calculated duty ratio. Thereafter, the duty ratio conversion section 54 outputs the generated signals PWMU and PWMD to the NPN transistors Q1 and Q2 of the buck-boost converter 12.

The increase in the duty factor of the NPN transistor Q2 that is placed on the ground line SL side of the buck-boost converter 12 causes the amount of energy storage in the reactor L1 to increase, so that it is possible to obtain a higher voltage output. On the other hand, the increase in the duty factor of the NPN transistors Q1 that is placed on the power line PL2 side of the buck-boost converter 12 causes the voltage of the power line PL2 to drop. Accordingly, it is possible to control the voltage between the power lines PL1 and PL2 to an arbitrary positive voltage by controlling the duty ratios of the NPN transistors Q1 and Q2.

Figure 3:
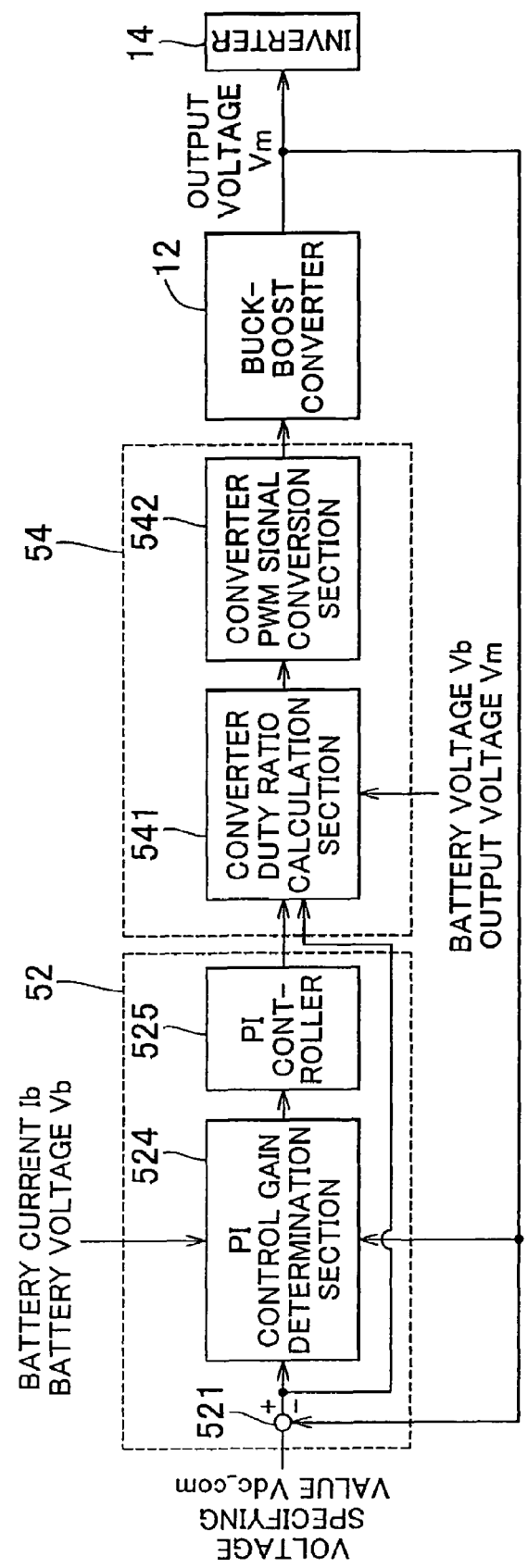
FIG. 3 is a functional block diagram of a feedback voltage specifying value calculation section and a duty ratio conversion section shown in FIG. 2.

FIG. 3 is a functional block diagram of the feedback voltage specifying value calculation section 52 and the duty ratio conversion section 54, which are shown in FIG. 2.

Referring to FIG. 3, the feedback voltage specifying value calculation section 52 includes a subtracter 521, a proportional-integral (PI) control gain determination section 524, and a PI controller 525.

The subtracter 521 receives the voltage specifying value Vdc_com and the output voltage Vm from the inverter input voltage specifying value calculation section 50 and the voltage sensor 13, respectively, and subtracts the output voltage Vm from the voltage specifying value Vdc_com. The subtracter 521 outputs the subtraction result as a deviation ΔVdc to the PI control gain determination section 524, and outputs the voltage specifying value Vdc_com, which is a desired voltage value, to the PI control gain determination section 524.

The PI control gain determination section 524 outputs, to the PI controller 525, a proportional gain Kp (hereinafter referred to as "the gain Kp") and an integral gain Ki (hereinafter referred to as "the gain Ki"), which are feedback gains, along with the voltage specifying value Vdc_com and the deviation ΔVdc.

As described later, the PI control gain determination section 524 changes the gain Kp according to the rate of change of a battery power Pb, which is derived from the value of the battery current Ib and the battery voltage Vb. In this way, control stability at the time of excessive regeneration is improved. It should be noted that the rate of change of the battery power Pb may be derived by multiplying the rate of change of the number of revolutions of the motor M1 by the torque specifying value.

The voltage transformer, which is placed between the DC power source B and the motor M1 shown in FIG. 1 and performs voltage transformation, includes: the voltage sensor 10 and the electric current sensor 11, which senses the input and output of electric power to and from the DC power source B; the buck-boost converter 12 having power control elements, which is placed in the path connecting between the power lines PL1 and PL2 that establish the connection to the DC power source B and the connection to the motor M1, respectively; and the controller 30 for controlling the buck-boost converter 12. The controller 30 monitors the change in the regenerated power that is supplied to the DC power source B, based on the outputs from the voltage sensor 10 and the electric current sensor 11, and, if the amount of change in the regenerated power is greater than a predetermined amount, the controller 30 changes the operation mode of the buck-boost converter 12 from a rapid operation mode to a slow operation mode.

The controller 30 performs feedback control of the buck-boost converter 12 based on the result of comparing the voltage of the power line PL2 and the desired voltage, and changes the operation mode from the rapid operation mode to the slow operation mode by decreasing the value of the gain Kp or Ki.

Referring again to FIG. 3, the PI controller 525 calculates the feedback voltage specifying value Vdc_com_fb based on the gain Kp and the gain Ki, which are supplied from the PI control gain determination section 524, as well as the deviation ΔVdc. Specifically, the PI controller 525 substitutes the gains Kp and Ki, which are supplied from the PI control gain determination section 524, as well as the deviation ΔVdc into the following equation to calculate the feedback voltage specifying value Vdc_com_fb.

$$Vdc\_com\_fb = Kp \cdot \Delta Vdc + Ki \cdot \Sigma \Delta Vdc \qquad (1)$$

The PI controller 525 outputs the calculated feedback voltage specifying value Vdc_com_fb to the duty ratio conversion section 54.

The duty ratio conversion section 54 includes a section 541 for calculating a duty ratio for the converter, and a section 542 for performing conversion to obtain a PWM signal for the converter. The converter duty ratio calculation section 541 calculates a duty ratio that is used to make the output voltage Vm, which is supplied from the voltage sensor 13, equal to the feedback voltage specifying value Vdc_com_fb, based on the DC voltage Vb supplied from the voltage sensor 10 and the feedback voltage specifying value Vdc_com_fb supplied from the PI controller 525.

The converter PWM signal conversion section 542 generates the signals PWMU and PWMD for turning on and off the NPN transistors Q1 and Q2 of the buck-boost converter 12, based on the duty ratio supplied from the converter duty ratio calculation section 541. The converter PWM signal conversion section 542 outputs the generated signals PWMU and PWMD to the NPN transistors Q1 and Q2 of the buck-boost converter 12.

The NPN transistors Q1 and Q2 of the buck-boost converter 12 are turned on and off based on the signals PWMU and PWMD. In this way, the buck-boost converter 12 transforms the DC voltage to the output voltage Vm so that the output voltage Vm becomes equal to the voltage specifying value Vdc_com.

Figure 4:
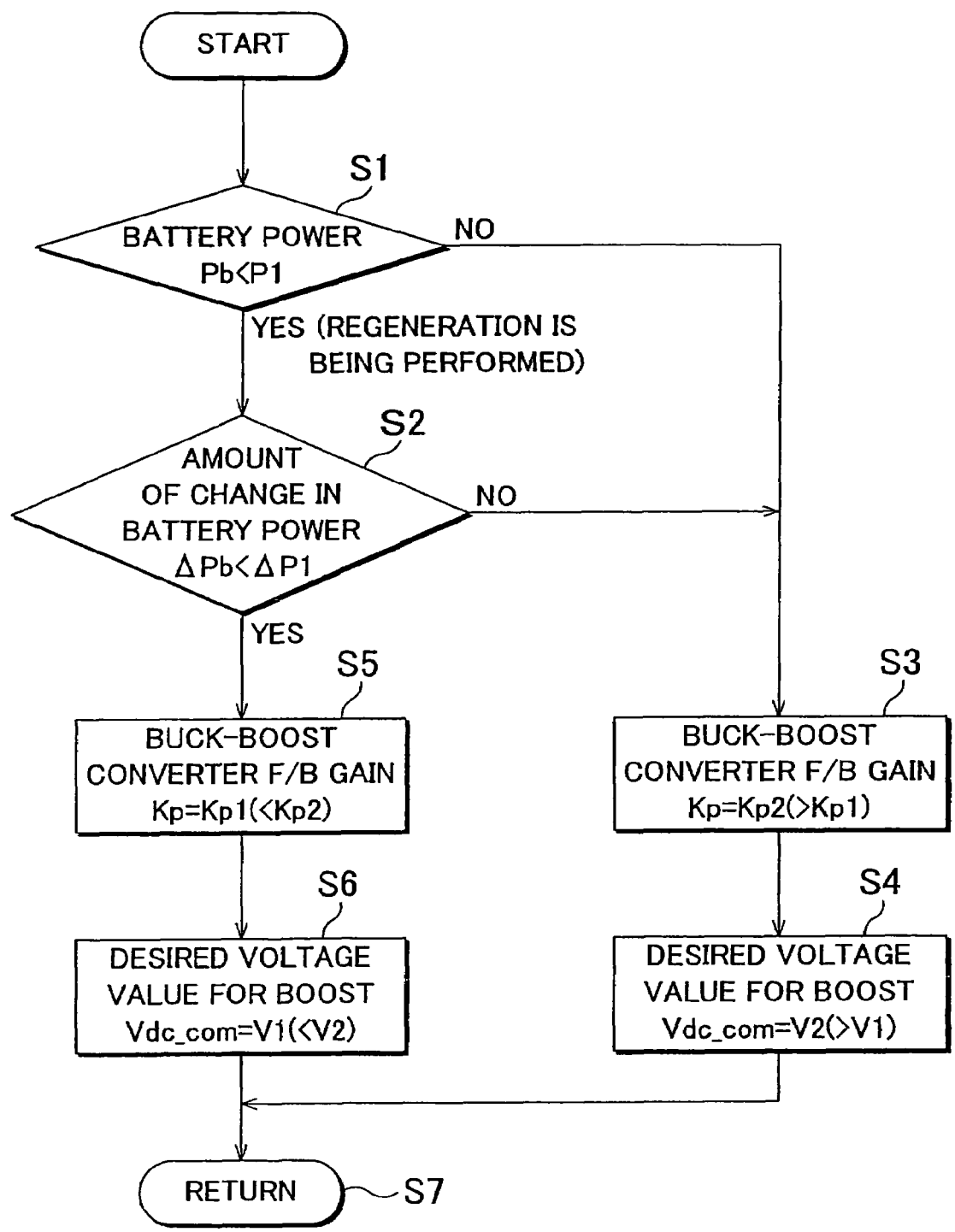
FIG. 4 is a flow chart for explaining the control in which a voltage specifying value and a gain are changed by an inverter input voltage specifying value calculation section shown in FIG. 2 and a PI control gain determination section shown in FIG. 3, respectively.

FIG. 4 is a flow chart for explaining the control in which the voltage specifying value (desired voltage value for boost) and the gain are changed by the inverter input voltage specifying value calculation section 50 shown in FIG. 2 and the PI control gain determination section 524 shown in FIG. 3, respectively. The procedure shown in this flow chart is called by a certain main routine and executed at predetermined intervals or every time a predetermined condition is satisfied.

Referring to FIG. 4, once the procedure is initiated, it is determined whether the battery power Pb is smaller than a predetermined value P1 in step S1. The battery power is the product of the value of the battery current Ib and the battery voltage Vb. A positive battery power indicates that the DC power source B is discharging, and a negative battery power indicates that the DC power source B is being charged by regenerated power. The predetermined value P1 is a negative value indicating that the regeneration for the battery is being performed, which is −20 kW, for example.

The amount of change in the battery power Pb may be derived by calculating the amount of change in the product of the torque specifying value and the number of revolutions of the motor M1.

If the condition, the battery power Pb<P1, is satisfied, the procedure proceeds to step S2. If this condition is not satisfied, the procedure proceeds to step S3.

In step S2, it is determined whether the amount of change ΔPb in the battery power Pb is smaller than a predetermined value ΔP1. The predetermined value ΔP1 is −10 kW/10 ms, for example. If the condition, the battery power change amount ΔPb<ΔP1, is satisfied, the procedure proceeds to step S5. If this condition is not satisfied, the procedure proceeds to step S3.

In step S3 and thereafter, normal processes are performed. In step S3, the gain Kp, which is a feedback gain of the buck-boost converter, is set to a predetermined value Kp2. The predetermined value Kp2 is 2.0, for example. In step S4, the voltage specifying value Vdc_com, which is the desired voltage value of the buck-boost converter, is set to a predetermined value V2. The predetermined value V2 is 650 V, for example.

In steps S5 and S6, because it is determined that an excessive amount of regenerated power is supplied to the DC power source B in steps S1 and S2, the operation mode of the buck-boost converter is changed from the rapid operation mode to the slow operation mode. Specifically, in step S5, the gain Kp, which is a feedback gain of the buck-boost converter, is set to a predetermined value Kp1. The predetermined value Kp1 which is 1.0, for example, is smaller than the predetermined value Kp2. In step S6, the voltage specifying value Vdc_com, which is the desired voltage value of the buck-boost converter, is set to a predetermined value V1. The predetermined value V1, which is 600 V, for example, is smaller than the predetermined value V2.

After the process in step S4 or S6 is completed, the procedure proceeds to step S7, and the control is passed back to the main routine.

Figure 5:
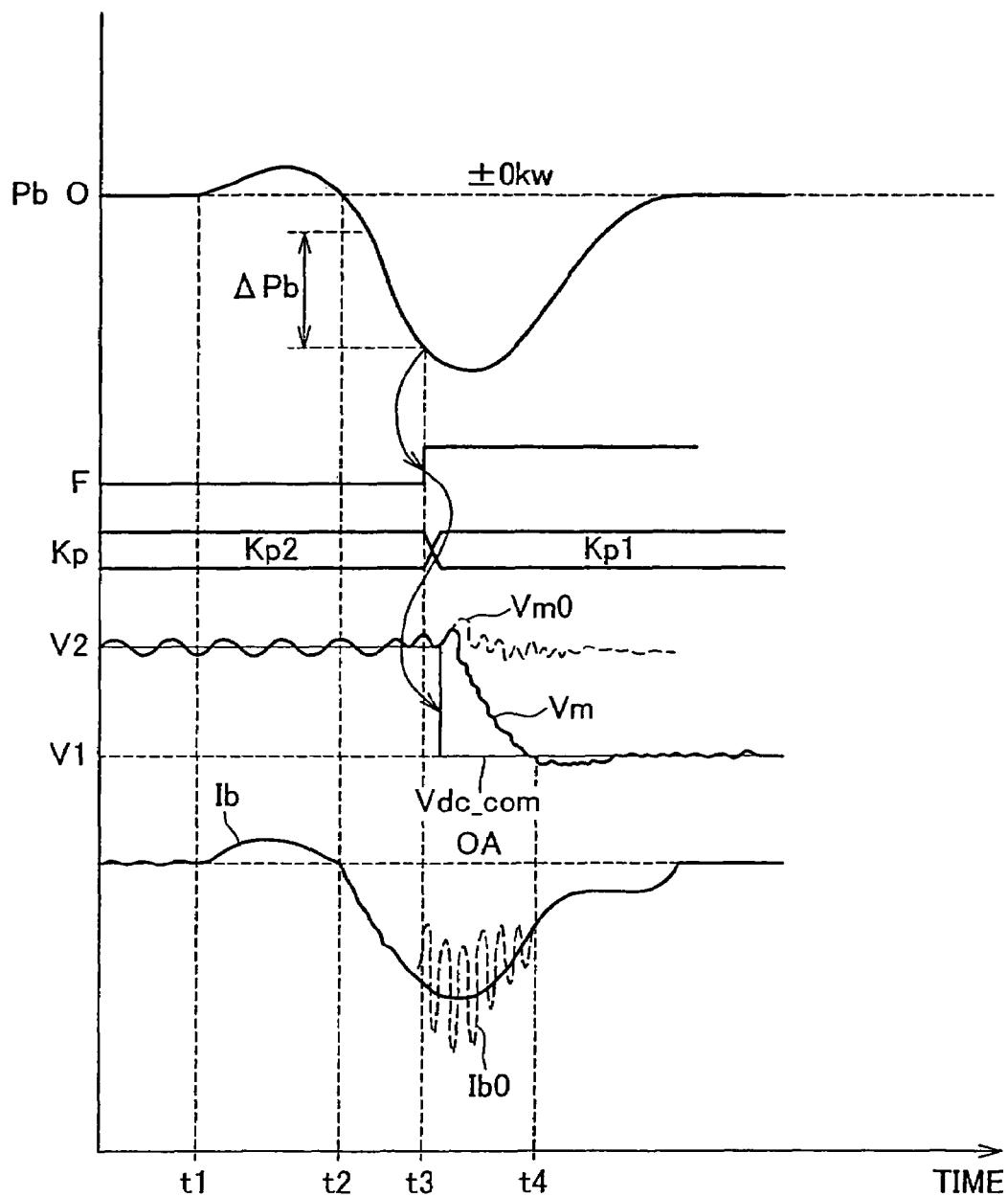
FIG. 5 is a time chart showing the change in voltage and electric current in the course of the feedback gain changing control according to the embodiment of the present invention.

FIG. 5 is a time chart showing the change in the voltage and the electric current in the course of the feedback gain changing control.

Referring to FIG. 5, from t1 to t2, the number of revolutions increases and the battery power Pb becomes plus because a wheel hits an obstacle and turns free, for example. Specifically, electric power is discharged from the DC power source B. At this time, the value of the battery current Ib also becomes plus.

At t2, the number of revolutions suddenly drops when the wheel that is turning free lands, and the electric power becomes excessive in the inverter. Accordingly, the regeneration becomes excessive, and the battery power Pb becomes minus. The battery current Ib and the battery voltage Vb are measured at every predetermined sampling cycle. ΔPb is the difference between Pb(n) that is derived from the n-th sampling values Ib(n) and Vb(n) by taking the product thereof, and Pb(n+1) that is derived from the (n+1)th sampling values Ib(n+1) and Vb(n+1) by taking the product thereof, and, when ΔPb becomes greater than the predetermined value, a rapid regeneration flag F is activated.

The amount of change in the battery power Pb may be derived by calculating the amount of change in the product of the torque specifying value and the number of revolutions of the motor M1. In this case, ΔPb is derived by multiplying the torque specifying value by the difference between the number of revolutions Nm(n+1) that is obtained by the (n+1)th measurement and the number of revolutions Nm(n) that is obtained by the n-th measurement.

The gain Kp is changed from the predetermined value Kp2 to the predetermined value Kp1 according to the state of activation of the rapid regeneration flag F. Kp1 and Kp2 satisfy the inequality Kp1<Kp2. Kp1 and Kp2 are 1.0 and 2.0, respectively, for example. When only the gain Kp is changed, overvoltage can occur with respect to the desired voltage value of the buck-boost converter.

Figure 6:
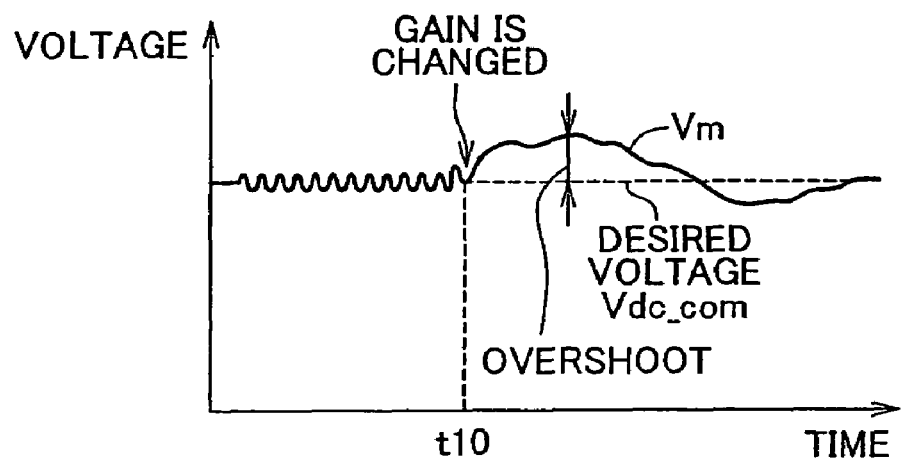
FIG. 6 is a diagram for explaining an examined example in which only a feedback gain is decreased without changing a desired voltage (voltage specifying value)

FIG. 6 is a diagram for explaining an examined example in which only the gain Kp is decreased without changing the voltage specifying value Vdc_com, which is the desired voltage value.

Referring to FIG. 6, if the excessive regeneration is sensed at t10, and the gain Kp is changed to a smaller value, the overshoot of the output voltage (motor voltage) Vm increases from t10. This is because, when the gain Kp is changed to a smaller value, the response of the buck-boost converter is worsened, which arises the fear of the occurrence of overvoltage in the inverter. It is preferable to change the desired voltage value for boost of the buck-boost converter 12 also to a relatively small value.

Accordingly, as shown in FIG. 5, the voltage specifying value Vdc_com, which is the desired voltage value for boost of the buck-boost converter 12, is changed from the predetermined value V2 to the predetermined value V1. The voltages V1 and V2 satisfy the inequality V1<V2, and V1 and V2 are 600 V and 650 V, respectively, for example. When the amount of change in the regenerated power is greater than the predetermined amount, the controller 30 decreases the desired voltage of the buck-boost converter.

If the gain and the desired voltage value are changed in this way when the regeneration becomes excessive, the hunting of the output voltage (motor voltage) Vm and the battery current Ib is less than that of the output voltage (motor voltage) Vm0 and the battery current Ib0, which are represented by the broken lines, and would be if such a control is not performed, and the control stability is improved.

Modified Embodiment

Figure 7:
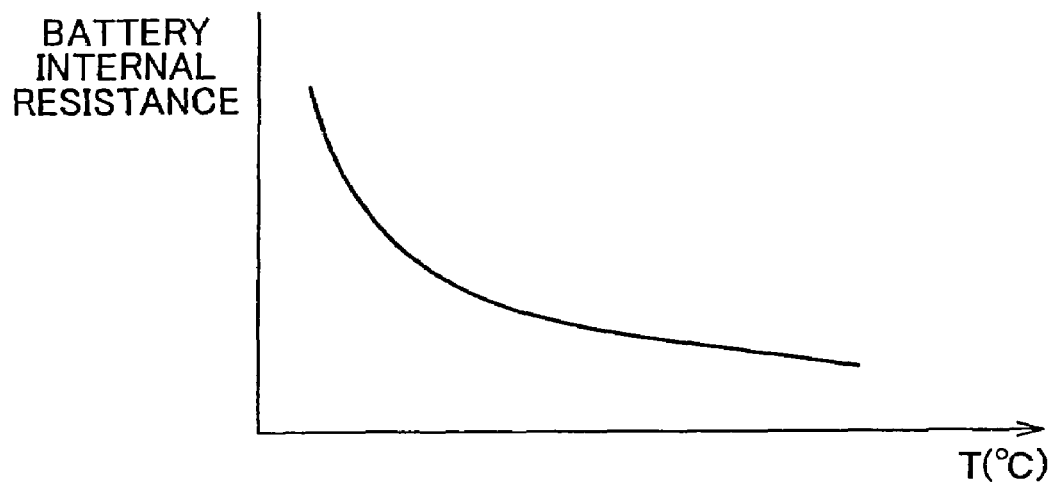
FIG. 7 is a diagram showing the relation between the internal resistance and the temperature of a battery.

FIG. 7 is a diagram showing the relation between the internal resistance and the temperature of a battery.

Because the internal resistance of a battery varies with temperature as shown in FIG. 7, it is possible to control the buck-boost converter 12 more stably with changeable feedback gains.

Figures 8, 9:
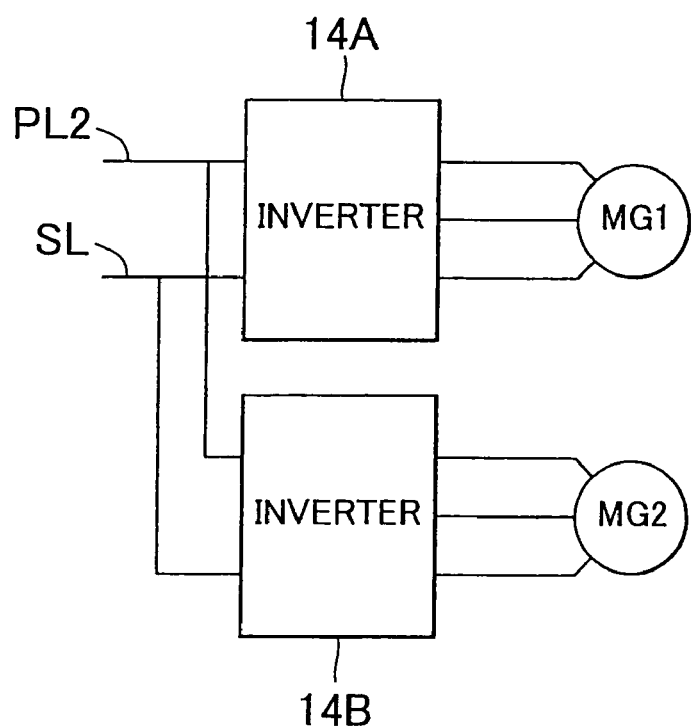
FIG. 8 is a diagram for explaining an example in which the feedback gain is changed according to the battery temperature.
FIG. 9 is a diagram for explaining application of the present invention to a hybrid vehicle.

FIG. 8 is a diagram for explaining an example in which the feedback gain is changed according to the temperature of the battery.

Referring to FIG. 8, during normal control, the gain Kp is set to 2 when the battery temperature is −15° C. or below, is set to 1.5 when the battery temperature is between −15° C. and −5° C., or is set to 1 when the battery temperature is −5° C. or above. The predetermined value Kp2 used in step S3 of FIG. 4 is set according to the battery temperature in this way.

On the other hand, while the excessive regeneration is corrected, the gain Kp is set to 1.5 when the battery temperature is −15° C. or below, is set to 1.2 when the battery temperature is between −15° C. and −5° C., or is set to 1 when the battery temperature is −5° C. or above. The predetermined value Kp1 used in step S5 of FIG. 4 is set according to the battery temperature in this way.

In short, the controller 30 changes the gain Kp according to the temperature Tb of the DC power source B.

The temperatures at which the gain Kp is changed, and the values to which the gain Kp is changed are merely exemplary. These values are appropriately selected according to the thermal variation characteristics of the internal resistance of the battery.

The modified embodiment makes it possible to control the buck-boost converter 12 more stably by using feedback gains that are variable according to the battery temperature.

The motor drive system 100 is installed in a hybrid vehicle, for example.

FIG. 9 is a diagram for explaining application of the present invention to a hybrid vehicle. In this case, the AC motor M1 shown in FIG. 1 includes two motor generators MG1 and MG2, and the inverter 14 includes two inverters. Specifically, as shown in FIG. 9, the two inverters 14A and 14B are provided corresponding to the motor generators MG1 and MG2. The inverters 14A and 14B are connected, in parallel, to the power line PL2 and the ground line SL that are connected across the capacitor C2.

The motor generator MG1 is connected to an engine via a power splitting mechanism (not shown), and the motor generator MG2 is connected to driving wheels via the power splitting mechanism.

The inverter 14A transforms the DC voltage supplied from the buck-boost converter 12 to an AC voltage to drive the motor generator MG1, and transforms the AC voltage that the motor generator MG1 generates using the turning force exerted by the engine to a DC voltage to supply the DC voltage to the buck-boost converter 12.

The inverter 14B transforms the DC voltage supplied from the buck-boost converter 12 to an AC voltage to drive the motor generator MG2, and transforms the AC voltage that the motor generator MG2 generates using the turning force exerted by the driving wheels to a DC voltage to supply the DC voltage to the buck-boost converter 12.

The battery power significantly varies toward the regeneration side when the production of electricity by the motor generator MG1 becomes excessively higher than the power consumption by the motor generator MG2. For example, the production of electricity by the motor generator MG1 is represented by the product of the torque specifying value and the number of revolutions of the motor generator MG1. The power consumption by the motor generator MG2 is represented by the product of the torque specifying value and the number of revolutions of the motor generator MG2. The difference between the production of electricity and the power consumption is the battery power Pb, and the feedback gain of the PI control of the buck-boost converter 12 is changed based on the measurement of the amount of change in the battery power Pb.

Even if the battery power Pb significantly varies toward the regeneration side in such a case, it is possible to inhibit the occurrence of overvoltage and to prevent hunting by the feedback control as described above, as well as to improve the control stability.

Accordingly, the present invention is particularly effective in performing feedback control of the buck-boost converter that is installed in a hybrid vehicle.

Although, in the above description of the embodiments, the proportional gain Kp out of the feedback gains used in the PI control is changed, the integral gain Ki may be changed similarly.

It should be understood that the embodiments disclosed herein are exemplary in all respects, and do not limit the present invention thereto. The scope of the present invention is defined not by the above description of the embodiments but by the claims. It is intended to cover all modifications within the scope of the claims and the equivalents thereof.

The invention claimed is:

1. A voltage conversion device placed between a DC power source and an electric motor, comprising:
    a sensor that senses input and output of electric power to and from the DC power source;
    a converter including power control elements, which is placed in a path connecting between a first power line that establishes connection to the DC power source and a second power line that establishes connection to the motor; and
    a controller that controls the converter;
    wherein the controller monitors the change in regenerated power generated by the motor that is supplied to the DC power source, based on an output from the sensor, and, when the amount of change in the regenerated power is greater than a predetermined amount, the controller changes an operation mode of the converter from a rapid operation mode to a slow operation mode by decreasing a value of a feedback gain.

2. The voltage conversion device according to claim 1, wherein the controller performs feedback control of the converter, based on a result of comparing a voltage of the second power line and a desired voltage.

3. The voltage conversion device according to claim 2, wherein, when the amount of change in the regenerated power is greater than the predetermined amount, the controller decreases the desired voltage.

4. The voltage conversion device according to claim 2, wherein the controller changes the feedback gain according to the temperature of the DC power source.

5. The voltage conversion device according to claim 2, wherein the feedback control is PI control, and the controller changes at least one of a proportional gain and an integral gain, which are feedback gains of the PI control.

6. A vehicle comprising the voltage conversion device according to claim 1.

7. A voltage conversion method comprising:
    sensing input and output of electric power to and from a DC power source;
    monitoring the change in regenerated power that is generated by a motor and is supplied to the DC power source, based on the input and output of the electric power; and
    changing an operation mode of a converter including power control elements from a rapid operation mode to a slow operation mode by decreasing a value of a feedback gain when the amount of change in the regenerated power is greater than a predetermined amount.

* * * * *